(12) United States Patent
Wallach et al.

(10) Patent No.: US 6,925,679 B2
(45) Date of Patent: Aug. 9, 2005

(54) AUTONOMOUS VACUUM CLEANER

(75) Inventors: Bret A. Wallach, San Diego, CA (US); Harvey A. Koselka, Trabuco Canyon, CA (US); David L. Gollaher, San Diego, CA (US)

(73) Assignee: Vision Robotics Corporation, San Diego, CA (US)

( * ) Notice: Subject to any disclaimer, the term of this patent is extended or adjusted under 35 U.S.C. 154(b) by 420 days.

(21) Appl. No.: 10/100,222

(22) Filed: Mar. 15, 2002

(65) Prior Publication Data

US 2002/0174506 A1 Nov. 28, 2002

Related U.S. Application Data

(60) Provisional application No. 60/276,300, filed on Mar. 16, 2001.

(51) Int. Cl.[7] .................................................. A47L 9/28
(52) U.S. Cl. ......................................... 15/319; 15/340.1
(58) Field of Search ................................ 15/319, 340.1

(56) References Cited

U.S. PATENT DOCUMENTS

| | | | | |
|---|---|---|---|---|
| 4,369,543 A | * | 1/1983 | Chen et al. | 15/319 |
| 5,012,886 A | * | 5/1991 | Jonas et al. | 15/319 |
| 5,341,540 A | | 8/1994 | Soupert et al. | 15/319 |
| 5,720,077 A | * | 2/1998 | Nakamura et al. | 15/340.1 |
| 5,903,124 A | | 5/1999 | Kawakami | 318/587 |
| 5,935,179 A | | 8/1999 | Kleiner et al. | 701/23 |
| 5,991,951 A | | 11/1999 | Kubo et al. | 15/50.1 |
| 6,076,226 A | | 6/2000 | Reed | 15/319 |
| 6,374,155 B1 | | 4/2002 | Wallach et al. | 700/245 |

FOREIGN PATENT DOCUMENTS

| | | |
|---|---|---|
| DE | 42 14 378 C1 | 8/1993 |
| JP | 2001-325023 | 11/2001 |
| JP | 2001-325024 | 11/2001 |
| WO | WO 00/10062 | 2/2000 |
| WO | WO 01/37060 A1 | 5/2001 |

OTHER PUBLICATIONS

Fiorini et al., "Cleaning and Household Robots: A Technology Survey," *Autonomous Robots 9*, pp. 227–235 (2000).
Prassler et al., "A Short History of Cleaning Robots," *Autonomous Robots 9*, pp. 211–226 (2000).

* cited by examiner

*Primary Examiner*—Theresa T. Snider
(74) *Attorney, Agent, or Firm*—Knobbe Martens Olson & Bear LLP

(57) ABSTRACT

An autonomous canister vacuum cleaner has a cleaning head module, a vacuum fan module separated from the cleaning module, and a hose assembly connecting the cleaning head module with the vacuum fan module. The vacuum fan module includes a controller that performs navigation and control functions for both the vacuum fan module and the cleaning head module. Alternatively, the controller may be separated from the vacuum fan module and the cleaning head module, and can be mobile. The vacuum fan module and the cleaning head module each include a drive mechanism for propulsion. The cleaning head module includes a cleaning brush assembly that can be motorized or air driven. The cleaning head module may also include a microcontroller that communicates with the controller.

113 Claims, 3 Drawing Sheets

AUTONOMOUS VACUUM CLEANER

RELATED APPLICATION

This application claims the benefit under 35 U.S.C. § 119(e) of U.S. Provisional Application No. 60/276,300, filed Mar. 16, 2001 and titled "AUTONOMOUS CANISTER VACUUM," which is hereby incorporated by reference in its entirety. This application is related to U.S. patent application Ser. No. 09/449,177, filed Nov. 24, 1999, now issued as U.S. Pat. No. 6,374,155 and titled "AUTONOMOUS MULTI-PLATFORM ROBOT SYSTEM," which is hereby incorporated by reference in its entirety.

BACKGROUND OF THE INVENTION

1. Field of the Invention

The present invention generally relates to the field of vacuum cleaners. More particularly, the invention relates to an autonomous vacuum cleaner having a robotic cleaning head.

2. Description of the Related Technology

It is well known that robots and robot technology can automate routine household tasks eliminating the need for humans to perform these repetitive and time consuming tasks. Currently, technology and innovation are both limiting factors in the capability of household cleaning robots. Computer processing power, battery life, electronic sensors such as cameras, and efficient electric motors are all either just becoming available, cost effective or reliable enough to use in autonomous consumer robots.

Several patents and other published documents have addressed both remote control and robot vacuum cleaners. One system uses a robot to move either a "dust buster" like custom upright vacuum. Most others integrate the vacuum and the robot into a single machine whether corded or battery powered.

Much of the work on robotic vacuum technology has centered on navigation and obstacle detection and avoidance. The path of a robot determines its success at cleaning an entire floor and dictates whether or not it will get stuck. Some proposed systems have two sets of orthogonal drive wheels to enable the robot to move directly between any two points to increase its maneuverability. Other prototype robot vacuum cleaners have mounted the suction mechanics on a pivoting or transverse sliding arm so as to increase the reach of the robot. Still other patents relate novel methods for detecting and avoiding obstacles.

Humans are very good at understanding the contents of a room and vacuuming around them while thoroughly cleaning the floor. Additionally, people can move objects to gain access to hard-to-clean areas. Currently there are two standard types of vacuums: upright and canister. Uprights tend to be more popular because they are smaller, easier to manipulate and less expensive to manufacture. Conversely, the principle advantage of canister vacuums is that, while they are more cumbersome, the cleaning head is smaller.

To date, no robot system exists that can move obstacles in order to clean and return the obstacles to their original position. Since all the proposed cleaning robots are relatively large and cumbersome, they fail to clean in tight areas or under or around furniture. In fact, no existing or proposed robot vacuum cleaner is able to clean nearly as well as a human.

SUMMARY OF CERTAIN INVENTIVE ASPECTS

The present invention includes embodiments of an autonomous, robot, vacuum cleaner analogous to a canister vacuum such that it includes both a canister and a cleaning head connected via a hose. Both modules have drive mechanisms and move independently as limited by the hose that connects them. This configuration, which offers both cleaning and localization advantages, has only recently become feasible due to advancement in robotic control algorithms, digital cameras and microprocessors. Prior to this, cost-effective processors capable of tracking a tethered two-module system did not exist.

Separating the cleaning head from the remainder of the autonomous vacuum enables the head to be significantly smaller than a single module (one piece) robot vacuum. Since the robot may clean the floor more slowly than a person, the cleaning head may even be made smaller than a typical vacuum power nozzle. A small cleaning head can access and clean small or tight areas including under and around furniture. While cleaning, a person may move a kitchen chair before sweeping the floor on which it rests. A one-piece vacuum robot is too large to clean the space between chair legs, between two or three chairs, or under and around most household furniture. However, the small cleaning head can fit between furniture legs and under any cross braces, thus cleaning almost as thoroughly as the person who moves the chairs before cleaning.

In one aspect of the invention, there is an autonomous canister vacuum cleaner, comprising a cleaning head module, a fan module separated from the cleaning module, wherein the fan module includes a controller that performs navigation functions, and a hose connecting the cleaning head module with the fan module. Each of the cleaning head module and the fan module may include a drive mechanism providing mobility. The controller may receive sensor input data from at least one of camera, sonar, lidar or infrared sensor. The controller may provide control signals to the drive mechanism in the cleaning head module via a wire assembly incorporated into or run adjacent to the hose. The fan module may provide electrical power to the cleaning head module via the wire assembly. The controller may provide control signals to the drive mechanism in the cleaning head module via a wireless transmitter and receiver assembly.

The cleaning head module of the autonomous canister vacuum cleaner may include a cleaning brush assembly having at least one cleaning brush. The cleaning head module may further include a motor to provide power to rotate the cleaning brush or the rotational movement of the cleaning brush may be driven by air. Alternatively, the cleaning brush does not rotate. The cleaning head module may include one or more motors for providing power to a drive mechanism that provides mobility. The cleaning head module may further include one or more encoders to provide data to the controller, where the data is associated with rotational movement of each drive motor. The drive mechanism may include drive wheels on at least one of the fan module and cleaning head module. Alternatively, the drive mechanism may includes a tread system on at least one of the fan module and cleaning head module. The controller may provide control signals to the motors in the cleaning head module via a wireless transmitter and receiver assembly. The cleaning head module may include one or more acoustic dirt sensors, ultrasonic distance sensors, moisture sensors, mold sensor or mechanical touch sensors that provide data to the controller. The cleaning head module may include at least one weight configured to maintain the cleaning head module in a position that is in substantially parallel contact with a surface to be cleaned.

The fan module of the autonomous canister vacuum cleaner may include a power cord for connection to a power outlet. The fan module may include one or more sensors providing data to the controller, wherein the data is associated with tracking the position of the power cord. The fan module may include a rechargeable battery and/or a fuel cell. The navigation functions may include localization, where localization may include tracking the cleaning head module. The fan module includes an electric motor for driving a fan.

In another aspect of the invention, there is an autonomous canister vacuum cleaner, comprising a cleaning head module; a fan module separated from the cleaning module, wherein the fan module includes a controller having navigation functions; a hose connecting the cleaning head module with the fan module; and a power cord for connecting the fan module to a power outlet, thereby providing power to the fan module.

In another aspect of the invention, there is an autonomous canister vacuum cleaner system comprising a cleaning head module, a fan module separated from the cleaning module and having an electric motor to drive a fan, a hose connecting the cleaning head module with the fan module and transferring dust from the cleaning head module to the fan module, and a controller module including a controller and providing navigation control signals to the fan module.

In yet another aspect of the invention, there is an autonomous canister vacuum cleaner method, comprising powering the fan module, connecting a cleaning head module to a fan module via a hose, performing navigation functions at the fan module, and propelling each of the cleaning head module and the fan module to move across a surface to be cleaned and according to results of the navigation functions. Performing the navigation functions may include localizing the fan module, where localizing may further include tracking the cleaning head module. The method may additionally comprise receiving sensor input data at the fan module from at least one of camera, sonar, lidar or infrared sensor. Propelling the cleaning head module may include moving a cleaning brush assembly having at least one cleaning brush and may further comprise rotating the cleaning brush. The method may further comprise wirelessly providing control signals from the fan module to the cleaning head module. Alternatively, the method may further comprise providing control signals from the fan module to the cleaning head module via a wire assembly extending axially along the hose, and may further comprise providing power from the fan module to the cleaning head module via the wire assembly. The method may further comprise rotating the cleaning brush by air flow. Alternatively, the cleaning brush may be stationary.

The method may further comprise providing encoder data, indicative of movement of the cleaning head module, to the fan module. The method may further comprise providing sensor data from one or more acoustic dirt sensors, ultrasonic distance sensors, moisture sensors, mold sensors or mechanical touch sensors in the cleaning head module to the fan module. The method may further comprise providing at least one weight in the cleaning head module to maintain a position that is in substantially parallel contact with a surface to be cleaned. The method may further comprise connecting a power cord at the fan module to a power outlet, and may further comprise extending and retracting the power cord as the fan module moves. The method may further comprise tracking the power cord position and providing sensor data indicative of the power cord position to a controller located in the fan module. Powering the fan module may comprise receiving power from a power source internal to the fan module.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

FIG. 1a is a front perspective view diagram of one embodiment of an autonomous canister vacuum cleaner.

FIG. 1b is a rear perspective view diagram of one embodiment of the autonomous canister vacuum cleaner shown in FIG. 1a.

DETAILED DESCRIPTION OF CERTAIN EMBODIMENTS

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

Figures 1A, 1B:
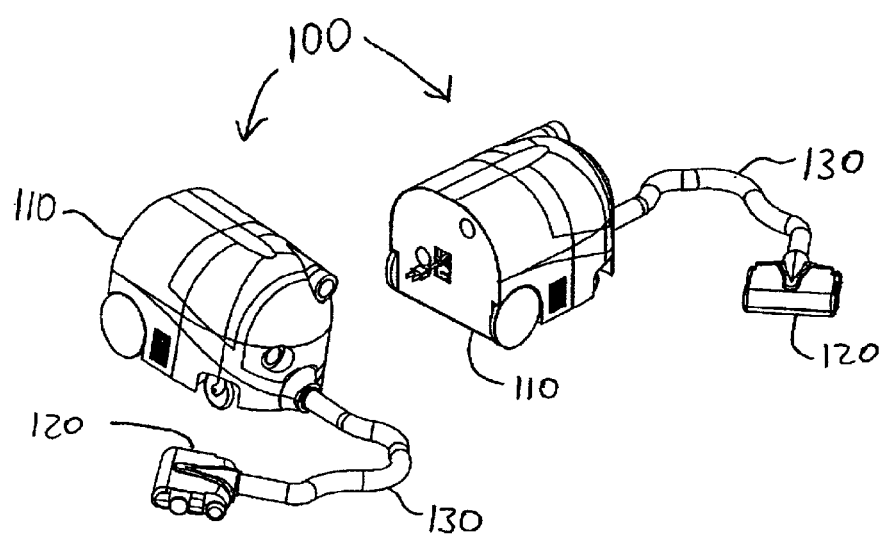

An embodiment of the present invention provides an autonomous canister vacuum cleaner (ACVC) 100 shown in FIG. 1a (front view) and FIG. 1b (rear view). The ACVC 100 includes two major assemblies analogous to a standard canister vacuum cleaner: a canister assembly or module 110, which may be also referred to as a fan module or control platform and which will be further described in conjunction with FIG. 2, and a cleaning head assembly or module 120 connected via a hose assembly 130, which will be further described in conjunction with FIG. 3. The canister 110 includes a controller that can be embodied on one or more printed circuit boards.

Figure 2:
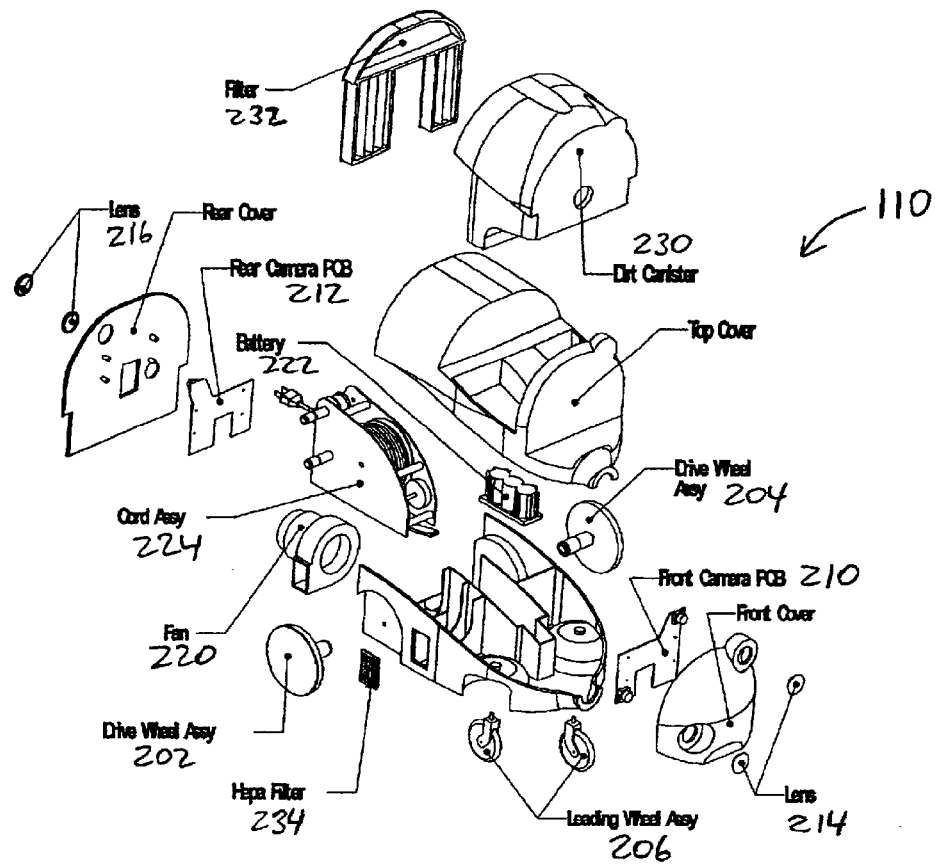
FIG. 2 is an exploded view diagram of selected components of a canister assembly of the autonomous canister vacuum cleaner shown in FIGS. 1a and 1b.
Figure 3:
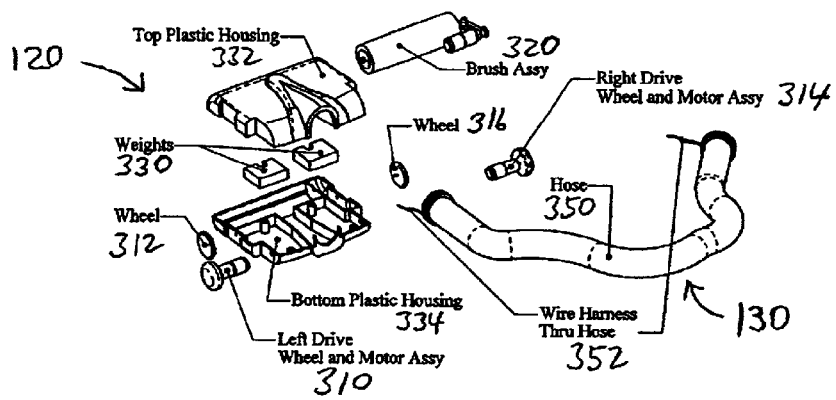
FIG. 3 is an exploded view diagram of selected components of a cleaning head assembly and hose of the autonomous canister vacuum cleaner shown in FIGS. 1a and 1b.

One embodiment of the ACVC 100 utilizes a power cord and bagless vacuum technology. Other embodiments can utilize rechargeable batteries, fuel cells, or other self-contained sources of power which can eliminate the need for the power cord. Other removable containers for collecting the dirt, dust and debris, such as cloth, paper or other materials, are also contemplated. Each of the modules 110 and 120 moves using a drive or propulsion system, such as with leading or trailing wheels or skid plates and are driven by one or motors and wheel control electronics. FIGS. 2 and 3 do not show items such as such as shrouds to keep debris from the motors and electronics or wiring harnesses. The canister module 110 includes an electric motor for driving a vacuum fan.

Canister Overview

Referring to FIG. 2, the canister assembly or module 110 which includes an embodiment of the controller portion of the autonomous canister vacuum cleaner 100 will now be described. Like a standard canister vacuum, the canister, or "fan module" 110, contains a vacuum (suction) fan 220, bag or debris collection area 230, filters 232 and 234, power cord assembly 224 and/or battery 222, and requisite switches and electronics (not shown). In one embodiment, the canister 110 also houses the robotic components including a computer or microprocessor and other electronic assemblies 210 and 212 that comprise a controller, sensors (which may be located on the electronic assemblies 210 and 212) and sensor lenses 214 and 216, drive motor and wheel assembly 202 and 204 or treads (not shown), and optional wheel(s) 206. The drive motors can include encoders to aid in telemetry. Digital cameras are a preferred primary sensor for tracking and localization, but sonar, lidar, and infrared and touch sensors are some of the acceptable alternatives and/or additional sensor supplements.

In one embodiment, the autonomous vacuum 100 includes two robots (the canister 110 and cleaning head 120) and includes two tethers connected to the canister (the hose 130 and a power cord in the power cord assembly 224). This embodiment utilizes household current to power the ACVC 100. The power cord assembly 224 includes a cord winding mechanism or subassembly. A motor pulls the cord to unwind or extend the cord, and a constant force spring rewinds or retracts the cord. A motor driven, stiff, curved pusher is a mechanism utilized for plugging the power cord into wall outlets.

The power cord is let out and retrieved at a controlled rate equal to the controller speed by the cord winding mechanism. The maximum controller speed likely occurs when the canister robot is turning rather than when it is travelling in a straight line. Encoder or other feedback relates to the amount of the power cord being let out or rewound through the entire length of the cord. The mechanism includes limit switches that are engaged both when the cord is fully wound and fully unwound.

In one embodiment, the power cord is a minimum 20 meters (m) long cord. Any standard cord is acceptable, subject to the vacuum power requirements and subject to heat, inductance, magnetic and noise of the specific implementation. In one embodiment, the power cord has markings to make it easily identifiable to the sensor system.

In one embodiment, the canister platform 110 has two printed circuit boards (PCBs) or circuit assemblies 210 and 212, each containing two digital cameras or other sensors, a microprocessor, a microcontroller, memory, and interfaces. The microprocessor can be any of various microprocessors such as available from Intel, Motorola and others. The processor typically operates at 100 mips or faster. The microcontroller can be a PIC series microcontroller available from Microchip Technology Inc., a SX52 or equivalent microcontroller available from Ubicom, Inc., or other similar microcontrollers available from other manufacturers. In another embodiment, the microcontroller can be on a separate printed circuit board that can communicate with the main board. The microcontroller typically provides low-level control to all motors and processes sensor and encoder information. In one embodiment, the controller electronics controls:

controller drive wheel motors, controller drive wheel encoders, cord winder motor, cord winder encoders, cord winder limit switches lights.

The sensors of the front circuit assembly 210 look forward toward the cleaning head 120, and the sensors of the rear circuit assembly 212 look rearward towards the power cord. The sensors, e.g., cameras, located on the rear circuit assembly 212 can be utilized to track the position of the power cord. The two assemblies 210 and 212 communicate with each other using an interface (not shown) that is well known in the technology. These circuit assemblies 210 and 212, which function as the canister/fan module controller, are responsible for navigation, mapping the home or building environment, controlling and tracking the position of the cleaning head 120, and managing the power cord(s) and the hose 130. In one embodiment, the controller also processes all the data for scheduling and all other algorithms.

Digital cameras are the preferred primary system sensors. One embodiment uses two sets of two cameras (stereo vision). Two examples are cameras using complementary metal oxide semiconductor (CMOS) and charge-coupled devices (CCD), both of which are used in standard webcams. CMOS cameras can operate in the infrared light region, and thus enable the ACVC to work in the dark. In one embodiment, the cameras are mounted at 45 degrees, but any angle, including horizontal and vertical, is acceptable. A preferred camera lens provides a horizontal viewing angle between 60 and 90 degrees. Sonar, lidar and ultrasonic sensors are alternatives for the primary sensor.

One embodiment includes bagless technology utilizing the filter 232 to separate the fan 220 from the debris compartment, canister, or container 230, and a High Efficiency Particulate Arrestance (HEPA) filter 234 to clean the exhaust. Other embodiments may utilize bags or other types of containers for the debris. The drive wheels 202 and 204 (two per platform in one embodiment) are powered by the battery 222 to move the ACVC 100 between rooms when it is not plugged into an AC outlet and vacuuming. Each drive motor has optical encoders to measure distance traveled. Optional dirt and moisture sensors may be included. The canister 110 may have forward and/or rearward facing lights. Depending on the sensor type (e.g., cameras), the lights may emit infrared or visible light. Because some components require direct current (DC) power, the ACVC includes a power supply (not shown), which may optionally be incorporated into any of the printed circuit boards.

Propulsion And Steering Mechanisms

In one embodiment, two drive wheel and motor assemblies 202 and 204 located on either side of the ACVC operate independently to propel and steer the ACVC. When both are spinning in the same direction, the ACVC moves forward or back. If they are turning in opposite directions, the ACVC rotates in place. If they are going in the same direction, but at different speeds, the ACVC turns along an arc. Using wheels in this type of system generally require one or more casters or skid plates 206 to provide stability. Alternatively, treads can be used instead of the drive wheels and casters in a design similar to a tank. The electronics pulse width modulates (PWM) the power to enable the drive mechanism to work at a variety of speeds. One embodiment utilizes encoders integrated into the drive wheel motors to aid in determining the ACVC actual motion and speed.

The other common drive system is like a typical automotive or a remote control car. One motor spins two wheels (either the front or the rear). A second, motor or servo turns the wheels around the vertical axis. Due to friction against the ground, the vehicle follows the direction of the steering tires. This configuration has the advantage of only requiring one drive motor, but does not have as much maneuverability as the two drive wheel configuration.

Another drive mechanism that has been used on robots is a three drive wheel system using "Omni Wheels" where each wheel is located at 120 degrees relative to the other wheels and is driven by a motor. An omni-wheel, as for example sold by Acroname, is a wheel that can turn around two perpendicular axes simultaneously. Transverse spinning mini-wheels are arranged around the perimeter of the main angle of motion. These side spinning wheels enable the main wheel to spin in a direction other than the direction of motion without dragging. Using proper control algorithms, the three wheels can be used to make the vehicle go in virtually any direction including directly sideways.

Cleaning Head And Hose Overview

Referring to FIG. 3, the cleaning head or cleaning module 120 and hose assembly 130 of the autonomous canister vacuum cleaner 100 will now be described. The cleaning head 120 has drive motors and wheels, a tread system or other mechanisms for locomotion. In one embodiment, the cleaning head 120 is propelled by a left drive wheel and motor assembly 310 with wheel 312 and a right drive wheel and motor assembly 314 with wheel 316. In one embodiment, the maximum continuous speed is approximately 20–25 cm/s, but the electronics pulse width modulates the motor power to control the cleaning head at speeds less than the maximum.

Despite the addition of the drive assemblies and wheels, the cleaning head 120 is significantly smaller than a typical canister vacuum power nozzle so it can clean hard to reach areas. The smaller head size is possible because the robot does not need to be in a hurry and can clean the room slowly. To keep the head 120 in contact with the surface to be cleaned, one or more weights 330 are located in a top plastic housing 332 and/or a bottom plastic housing 334. For example, two weights can be used, and their location in the head 120 may be different in other embodiments. The cleaning head 120 also uses the weights 330 or other similar method to provide balance and stability so as to pass over thresholds or other disturbances on a floor. In one embodiment, the head 120 includes encoders integral to the drive motor assemblies 310 and 314. Alternate embodiments have separate encoders. The cleaning head 120 may include sensors such as acoustic dirt sensors, ultrasonic distance sensors, mechanical touch sensors, moisture sensors, and mold sensors to aid in cleaning.

Sensitized bumpers or touch sensors may be incorporated on all sides of the cleaning head and extend its full height, length and width. The bumpers detect whether the cleaning head runs into an object in the room.

One embodiment includes a cleaning head similar to a power nozzle for a traditional canister vacuum cleaner. The cleaning head 120 contains a motor driven beater brush 320. The cleaning brush assembly is powered by a DC motor to allow it to spin at a variety of speeds in both directions to enhance the cleaning characteristics for all floor surfaces and to help recover from potential stalls. The motor driven brush system works very well for deep, plush carpets and rugs. The cleaning brush assembly 320 is configured to enable at least one side of the cleaning head 120 to vacuum against a wall.

An alternative embodiment for the cleaning head includes an air driven, "turbo," beater brush. The turbobrush is air driven and powered by the fan in the canister vacuum cleaner. As in a traditional canister vacuum cleaner, the air driven subsystem does not require power and, therefore, the hose and cleaning head do not need to be electrified for the turbobrush. The turbobrush tends to work well on short pile carpet a rugs.

In another embodiment, the cleaning head 120 may have a stationary brush. This is the simplest cleaning head design because it minimizes the number of moving parts and the size of the cleaning head. This design works best on hard floors such as wood or tile.

Other embodiments could include a mechanism for a wet vacuum to clean liquids or a complete mop system. The wet vacuum includes a small suction head that is held tightly against the ground and a dirty water reservoir in the controller/fan module. The mop system requires both suction and a spray system to dispense water and a cleaning solution onto the floor. In addition, the controller/fan module has a clean water reservoir.

The canister 110 is connected to the cleaning head 120 via a co-extruded hose assembly 130 that may include power and control/data wires in a wire harness 352. The wire harness 352 is either incorporated into a hose 350 or runs adjacent (inside or outside) to the hose 350. Alternatively, standard powered canister vacuum hoses or stretch hoses may be used. One embodiment uses a hose that enables the cleaning head to move two meters from the controller module. The hose connection to the cleaning head or controller may include pivots around one or more of the X, Y & Z axes if necessary.

In one embodiment, the canister 110 communicates via the control/data wires with a microcontroller (not shown) at the cleaning head 120. In another embodiment, the wire harness 352 connects the electrical components (e.g., motors and sensors) in the cleaning head 120 directly to control circuits in the canister 110 eliminating the need for control circuitry in the head 120. While eliminating the need for the microcontroller in the cleaning head 120, this configuration may become awkward as the number of conductors increases. In yet another embodiment, the control signals and sensor data are wirelessly transmitted between the canister and cleaning modules using wireless techniques well known in the technology. In one embodiment, power for the cleaning head drive motors 310 and 314 (and the optional motor in the brush assembly 320) is transmitted directly from the canister 110 to the motors in the cleaning head 120 regardless of whether the robot is corded, battery or fuel cell powered. Additionally, sensor information from encoders, dirt sensors or other sensors in the head is transmitted directly to the canister controller via the wire harness 352. The ends of the wire harness 352 are shown in FIG. 3. A preferred embodiment minimizes the number of wires between the controller 110 and the cleaning head 120. Five conductors are typically used in one configuration: two for power and three to transmit and receive the control and data signals.

In an alternative embodiment, the controller 110 has direct control over each motor and collects data from each sensor in the cleaning head utilizing a low cost network interface connector and methodology such as X10. Alternatively, the controller module and the cleaning head module can communicate via wireless transmission using various types of well known technology, including ultrasonic components.

In the embodiment where the cleaning head 120 includes a microcontroller, the canister controller 110 sends basic commands to the cleaning head's microcontroller, which the microcontroller interprets and then properly controls all onboard motors and sensors. For example, the controller 110 may instruct the cleaning head 120 to move straight forward twelve inches. The microcontroller activates the drive mechanism (e.g., both drive wheels), monitors the encoders until each wheel has moved the proper distance, and then shuts off the motor. If an ultrasonic or touch sensor detects an obstacle, the microcontroller stops the cleaning head 120 and transmits the presence of the obstacle to the controller 110.

In an alternative embodiment, the canister 110 contains vacuum and drive components, but the controller and sensors may be mounted on a separate controller robot, or a third module (not shown). These machines then communicate via a wireless system. Alternatively, the third module may be stationary rather than a mobile robot.

Localization, Navigation, and Control

In certain embodiments, the autonomous canister vacuum system 100 functions as a two robot system, such as described in Applicant's copending patent application, U.S. patent application Ser. No. 09/449,177, corresponding to U.S. Pat. No. 6,374,155, which is hereby incorporated by reference. In one embodiment, the canister portion of the vacuum functions as the system controller (i.e., the navigator robot of the referenced patent application). The canister portion contains the cameras and electronics along with robot and vacuum components. The cleaning head functions as the functional robot of the referenced patent application. A difference between the two-robot system and the autonomous canister vacuum system is that the vacuum hose tethers the two robots in the vacuum system. The hose is an added complexity, but the cleaning head robot is generally simpler than the described functional robot since it does not have control components, in one embodiment. This vacuum system configuration also eliminates the need for a wireless communications interface between the two assemblies.

Figure 4:
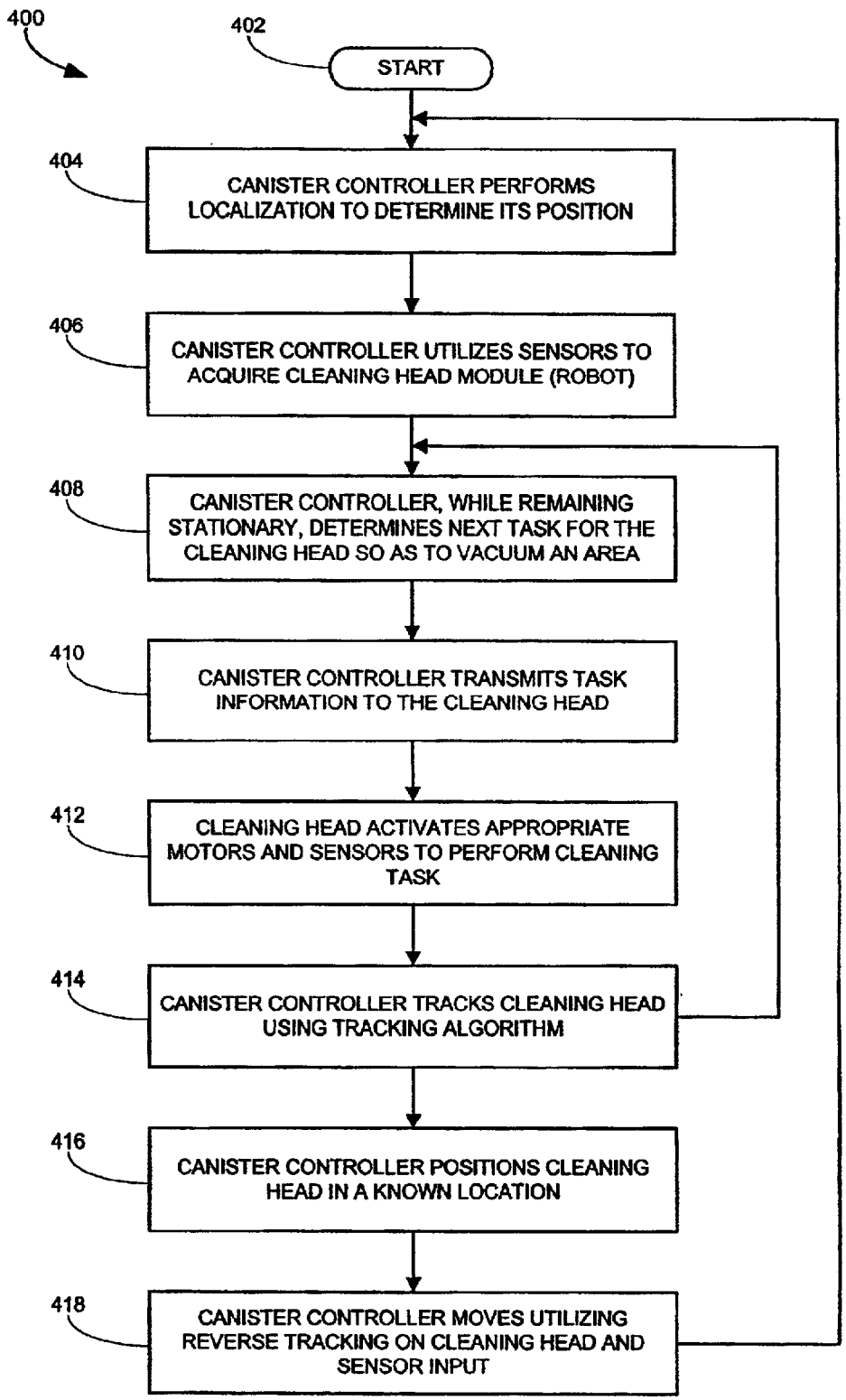
FIG. 4 is a flowchart of an embodiment of a process performed during operation of the autonomous canister vacuum cleaner shown in FIGS. 1a and 1b.

The flowchart of FIG. 4 illustrates one embodiment of a navigation, localization and control process 400 performed by the autonomous canister vacuum 100. Process 400 is primarily performed or directed by the controller 110. It is difficult for mobile robots to keep track of their position and orientation (localization). Generally, the most computationally intensive part of localization is for the mobile robot to track its own position as it moves. The master platform (canister/controller 110) moves infrequently. It moves when it needs access to a new portion of a room to vacuum or to change its vantage point to track and control the cleaning head.

Conversely, it requires relatively little computational power for a stationary system to track the position of a moving object. This robot canister vacuum 100 minimizes the required processing power because the cleaning head 120, rather than the canister 110, performs most of the movements.

The navigation, localization and control process 400 begins at a start state 402 and proceeds to a state 404 where the controller 110 performs localization to determine its position. One embodiment of the ACVC 100 uses cameras as the primary (optical) sensors. The controller 110 tracks its position using dead reckoning combined with any combination of one or more localization algorithms utilizing landmarks or other available information. Other embodiments can use sonar, radar, lidar, and infrared sensors, in addition to, or in place of the optical sensors. Similarly, the controller 110 can use any known localization method or a combination of methods rather than the dead reckoning and landmark recognition described above. Localization methods are described in the previously referenced patent application.

Advancing to state 406, the controller 110 utilizes its sensors to acquire the cleaning head 120. Once the location of the cleaning head module 120 is known, process 400 continues at state 408, where the controller 110, while remaining stationary, determines the next task for the cleaning head 120 to do so as to vacuum an area. Proceeding to state 410, the controller 110 transmits the task information determined at state 408 to the cleaning head 120. As described above, the task information may be sent to a microcontroller at the cleaning head 120, or directly to motors and/or other components in the cleaning head. Continuing at state 412, process 400 directs the cleaning head 120 to activate its appropriate motors and/or sensors to perform the task received from the controller 110. Advancing to state 414, the controller 110 tracks the cleaning head 120 using a tracking algorithm, such as described in the previously referenced patent application. Process 400 continues at state 408 where the controller 110 determines the next task for the cleaning head.

When the canister controller 110 needs to move, it positions and stops the cleaning head 120 in a known location at state 416. The cleaning head 120 then serves as a known stationary landmark for the moving controller 110. This enables the canister controller 110 to perform reverse tracking at state 418 which is also less computationally intensive than a full localization routine. Reverse tracking is described in the previously referenced patent application.

Note that the particular states and/or the order of the states of process 400 may be modified, such as by combining states or grouping tasks together in a task sequence. In embodiments with a microcontroller at the cleaning head, higher level commands or task sequences may be sent from the controller to the cleaning head microcontroller. Other variations of the process 400 are envisioned.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. Many variations to the basic design are possible in other embodiments. The scope of the invention is indicated by the appended claims rather than by the foregoing description. All changes that come within the meaning and range of equivalency of the claims are to be embraced within their scope.

What is claimed is:

1. An autonomous vacuum cleaner, comprising:
   a cleaning head module;
   a fan module separated from the cleaning head module; and
   a hose connecting the cleaning head module with the fan module, wherein the cleaning head module and the fan module can move independently of each other, and either module can remain stationary when the other module moves along a path.

2. The autonomous vacuum cleaner defined in claim 1, wherein each of the cleaning head module and the fan module include a drive mechanism for providing independent mobility of the respective modules.

3. The autonomous vacuum cleaner defined in claim 1, wherein the fan module includes a controller that performs navigation functions.

4. The autonomous vacuum cleaner defined in claim 3, wherein the controller receives sensor input data from at least one of camera, sonar, lidar or infrared sensor on the fan module.

5. The autonomous vacuum cleaner defined in claim 3, wherein the controller provides control signals to a drive mechanism in the cleaning head module via a wire assembly incorporated into or run adjacent to the hose.

6. The autonomous vacuum cleaner defined in claim 5, wherein the fan module provides electrical power to the cleaning head module via the wire assembly.

7. The autonomous vacuum cleaner defined in claim 3, wherein the controller provides control signals to a drive mechanism in the cleaning head module via a wireless transmitter and receiver assembly.

8. The autonomous vacuum cleaner defined in claim 3, wherein the cleaning head module includes one or more motors for providing power to a drive mechanism that provides mobility of the cleaning head module.

9. The autonomous vacuum cleaner defined in claim 8, wherein the cleaning head module includes one or more encoders to provide data to the controller, wherein the data is associated with rotational movement of each of the one or more motors.

10. The autonomous vacuum cleaner defined in claim 8, wherein the drive mechanism includes drive wheels on at least one of the fan module and cleaning head module.

11. The autonomous vacuum cleaner defined in claim 8, wherein the drive mechanism includes a tread system on at least one of the fan module and cleaning head module.

12. The autonomous vacuum cleaner defined in claim 8, wherein the controller provides control signals to the motors in the cleaning head module via a wireless transmitter and receiver assembly.

13. The autonomous vacuum cleaner defined in claim 3, wherein the cleaning head module includes one or more acoustic dirt sensors, ultrasonic distance sensors, moisture sensors, mold sensor or mechanical touch sensors providing data to the controller.

14. The autonomous vacuum cleaner defined in claim 3, wherein the fan module includes a power cord for connection to a power outlet.

15. The autonomous vacuum cleaner defined in claim 14, wherein the fan module includes one or more sensors providing data to the controller, wherein the data is associated with tracking the position of the power cord.

16. The autonomous vacuum cleaner defined in claim 3, wherein the navigation functions include localization.

17. The autonomous vacuum cleaner defined in claim 16, wherein localization includes tracking the cleaning head module.

18. The autonomous vacuum cleaner defined in claim 1, wherein the cleaning head module includes a cleaning brush assembly having at least one cleaning brush.

19. The autonomous vacuum cleaner defined in claim 18, wherein the cleaning head module further includes a motor to provide power to rotate the cleaning brush.

20. The autonomous vacuum cleaner defined in claim 18, wherein the cleaning brush is driven by air so as to cause rotational movement.

21. The autonomous vacuum cleaner defined in claim 18, wherein the cleaning brush does not rotate.

22. The autonomous vacuum cleaner defined in claim 1, wherein the cleaning head module includes at least one weight configured to maintain the cleaning head module in a position that is in substantially parallel contact with a surface to be cleaned.

23. The autonomous vacuum cleaner defined in claim 1, wherein the fan module includes a rechargeable battery.

24. The autonomous vacuum cleaner defined in claim 1, wherein the fan module includes a fuel cell.

25. The autonomous vacuum cleaner defined in claim 1, wherein the fan module includes an electric motor for driving a fan.

26. An autonomous vacuum cleaner, comprising:
   a cleaning head module including a drive system having at least a propulsion mechanism;
   a fan module separated from the cleaning module, wherein the fan module includes a controller having navigation functions; and
   a hose connecting the cleaning head module with the fan module.

27. The autonomous vacuum cleaner defined in claim 26, wherein the fan module includes a fan and an electric motor for driving the fan.

28. The autonomous vacuum cleaner defined in claim 26, additionally comprising a power cord for connecting the fan module to a power outlet, thereby providing power to the fan module.

29. The autonomous vacuum cleaner defined in claim 28, wherein the power cord is extended and retracted as the fan module moves from a first location to a second location.

30. The autonomous vacuum cleaner defined in claim 28, wherein the cleaning head module includes one or more sensors providing data to the controller.

31. The autonomous vacuum cleaner defined in claim 30, wherein at least one of the one or more sensors is configured to track the power cord position.

32. The autonomous vacuum cleaner defined in claim 30, wherein the one or more sensors include one or more encoders, acoustic dirt sensors, ultrasonic distance sensors, moisture sensors, mold sensor or mechanical touch sensors.

33. The autonomous vacuum cleaner defined in claim 26, wherein the fan module provides power to the cleaning head module via a wire assembly extending axially along the hose.

34. The autonomous vacuum cleaner defined in claim 26, wherein the fan module includes a removable container for collecting dirt, dust and/or debris removed by the cleaning head module.

35. The autonomous vacuum cleaner defined in claim 26, wherein the cleaning head module includes a cleaning brush assembly having at least one cleaning brush.

36. The autonomous vacuum cleaner defined in claim 35, wherein the cleaning head module further includes a motor to provide power to rotate the cleaning brush.

37. The autonomous vacuum cleaner defined in claim 35, wherein the cleaning brush is driven by air so as to cause rotational movement.

38. The autonomous vacuum cleaner defined in claim 35, wherein the cleaning brush is stationary.

39. The autonomous vacuum cleaner defined in claim 26, wherein the cleaning head module further includes a steering mechanism to direct the motion of the cleaning head module.

40. The autonomous vacuum cleaner defined in claim 26, wherein the controller sends control signals to at least one motor in the cleaning head module.

41. The autonomous vacuum cleaner defined in claim 26, wherein the fan module includes a drive system having at least a propulsion mechanism and a steering mechanism to direct the motion of the fan module.

42. The autonomous vacuum cleaner defined in claim 41, wherein the controller sends control signals to at least one motor in the propulsion mechanism.

43. The autonomous vacuum cleaner defined in claim 26, wherein the navigation functions include localization and tracking.

44. The autonomous vacuum cleaner defined in claim 26, wherein the cleaning head module is configured to move independently of the fan module in more than one direction.

45. An autonomous vacuum cleaner system comprising:
   a cleaning head module;
   a fan module separated from the cleaning module and having an electric motor to drive a fan;
   a hose connecting the cleaning head module with the fan module and transferring dust from the cleaning head module to the fan module; and
   a controller module including a controller and providing navigation control signals to the fan module and to the cleaning head module.

46. The system defined in claim 45, wherein the cleaning head module, fan module, and hose together form a vacuum cleaner, and the controller module is at a location separate from the cleaning head module and the fan module.

47. The system defined in claim 46, wherein the controller module is mobile.

48. The system defined in claim 45, wherein the controller module is configured to perform localization and tracking functions for the fan module and the cleaning head module.

49. The system defined in claim 45, wherein the controller module includes one or more sensors providing data to the controller.

50. The system defined in claim 49, wherein the one or more sensors include at least one of camera, sonar, lidar or infrared sensor.

51. A method of vacuuming with an autonomous vacuum cleaner, the method comprising:
   powering a fan module;
   connecting a cleaning head module to the fan module via a hose;
   performing navigation functions at the fan module; and
   propelling each of the cleaning head module and the fan module to move across a surface to be cleaned and according to results of the navigation functions.

52. The method defined in claim 51, wherein performing the navigation functions includes localizing the fan module.

53. The method defined in claim 52, wherein localizing further includes tracking the cleaning head module.

54. The method defined in claim 51, additionally comprising receiving sensor input data at the fan module from at least one of camera, sonar, lidar or infrared sensor on the fan module.

55. The method defined in claim 51, wherein propelling the cleaning head module includes moving a cleaning brush assembly having at least one cleaning brush, wherein the cleaning brush assembly is mounted within the cleaning head module.

56. The method defined in claim 55, further comprising rotating the cleaning brush.

57. The method defined in claim 55, further comprising rotating the cleaning brush by air flow.

58. The method defined in claim 55, wherein the cleaning brush is stationary within the cleaning head module.

59. The method defined in claim 51, further comprising wirelessly providing control signals from the fan module to the cleaning head module.

60. The method defined in claim 51, further comprising providing control signals from the fan module to the cleaning head module via a wire assembly extending axially along the hose.

61. The method defined in claim 60, further comprising providing power from the fan module to the cleaning head module via the wire assembly.

62. The method defined in claim 51, further comprising providing encoder data, indicative of movement of the cleaning head module, to the fan module.

63. The method defined in claim 51, further comprising providing sensor data from one or more acoustic dirt sensors, ultrasonic distance sensors, moisture sensors, mold sensors or mechanical touch sensors in the cleaning head module to the fan module.

64. The method defined in claim 51, further comprising providing at least one weight in the cleaning head module to maintain a position that is in substantially parallel contact with the surface to be cleaned.

65. The method defined in claim 51, further comprising connecting a power cord at the fan module to a power outlet.

66. The method defined in claim 65, further comprising extending and retracting the power cord as the fan module moves across the surface.

67. The method defined in claim 66, further comprising:
tracking the power cord position; and
providing sensor data indicative of the power cord position to a controller located in the fan module.

68. The method defined in claim 51, wherein powering the fan module comprises receiving power from a power source internal to the fan module.

69. An autonomous vacuum cleaner, comprising:
a cleaning head module including one or more motors for providing power to a drive mechanism that provides mobility for the cleaning head module;
a fan module separated from the cleaning head module; and
a hose connecting the cleaning head module with the fan module.

70. The autonomous vacuum cleaner defined in claim 69, wherein the fan module includes a controller that performs navigation functions.

71. An autonomous vacuum cleaner, comprising:
a cleaning head module;
a fan module separated from the cleaning head module, wherein the fan module includes a controller, wherein each of the cleaning head module and the fan module include a drive mechanism providing independent mobility of the respective modules, and wherein the controller provides control signals to the drive mechanism in the cleaning head module; and
a hose connecting the cleaning head module with the fan module.

72. The autonomous vacuum cleaner defined in claim 71, wherein the fan module includes a controller that performs navigation functions.

73. An autonomous vacuum cleaner, comprising:
a cleaning nozzle;
a fan module separated from the cleaning nozzle; and
a hose connecting the cleaning nozzle with the fan module, wherein the cleaning nozzle is self-maneuverable.

74. The autonomous vacuum cleaner defined in claim 73, wherein the cleaning nozzle is configured to maneuver independently of the fan module and includes a drive mechanism that provides mobility for the cleaning nozzle.

75. An autonomous vacuum cleaner, comprising:
a cleaning head module;
a fan module separated from the cleaning head module; and
a hose connecting the cleaning head module with the fan module, wherein the cleaning head module and the fan module are configured to move independently of each other.

76. The autonomous vacuum cleaner defined in claim 75, wherein each of the cleaning head module and the fan module include a drive mechanism for providing independent mobility of the respective modules.

77. The autonomous vacuum cleaner defined in claim 75, wherein the fan module includes a controller that performs navigation functions.

78. The autonomous vacuum cleaner defined in claim 77, wherein the controller receives sensor input data from at least one of camera, sonar, lidar or infrared sensor on the fan module.

79. The autonomous vacuum cleaner defined in claim 77, wherein the controller provides control signals to a drive mechanism in the cleaning head module via a wire assembly incorporated into or run adjacent to the hose.

80. The autonomous vacuum cleaner defined in claim 79, wherein the fan module provides electrical power to the cleaning head module via the wire assembly.

81. The autonomous vacuum cleaner defined in claim 77, wherein the controller provides control signals to a drive mechanism in the cleaning head module via a wireless transmitter and receiver assembly.

82. The autonomous vacuum cleaner defined in claim 77, wherein the cleaning head module includes one or more motors for providing power to a drive mechanism that provides mobility of the cleaning head module.

83. The autonomous vacuum cleaner defined in claim 77, wherein the cleaning head module includes one or more acoustic dirt sensors, ultrasonic distance sensors, moisture sensors, mold sensor or mechanical touch sensors providing data to the controller.

84. The autonomous vacuum cleaner defined in claim 77, wherein the fan module includes a power cord for connection to a power outlet.

85. The autonomous vacuum cleaner defined in claim 75, wherein the cleaning head module includes a cleaning brush assembly having at least one cleaning brush.

86. The autonomous vacuum cleaner defined in claim 85, wherein the cleaning head module further includes a motor to provide power to rotate the cleaning brush.

87. The autonomous vacuum cleaner defined in claim 85, wherein the cleaning brush is driven by air so as to cause rotational movement.

88. The autonomous vacuum cleaner defined in claim 85, wherein the cleaning brush does not rotate.

89. The autonomous vacuum cleaner defined in claim 75, wherein the fan module includes a rechargeable battery.

90. The autonomous vacuum cleaner defined in claim 75, wherein the fan module includes a fuel cell.

91. The autonomous vacuum cleaner defined in claim 75, wherein the fan module includes an electric motor for driving a fan.

92. The autonomous vacuum cleaner defined in claim 75, wherein the cleaning head module is configured to move independently of the fan module in more than one direction.

93. An autonomous vacuum cleaner, comprising:
a cleaning head module;
a fan module separated from the cleaning head module, wherein the fan module directly controls the cleaning head module via data communication; and
a hose connecting the cleaning head module with the fan module.

94. The autonomous vacuum cleaner defined in claim 93, wherein the fan module includes a controller that performs navigation functions.

95. An autonomous vacuum cleaner, comprising:
a cleaning head module;
a fan module separated from the cleaning module, wherein the fan module includes a controller having navigation functions, wherein the navigation functions include localization and tracking; and
a hose connecting the cleaning head module with the fan module.

96. The autonomous vacuum cleaner defined in claim 95, wherein the fan module includes a fan and an electric motor for driving the fan.

97. The autonomous vacuum cleaner defined in claim 95, additionally comprising a power cord for connecting the fan module to a power outlet, thereby providing power to the fan module.

98. The autonomous vacuum cleaner defined in claim 97, wherein the power cord is extended and retracted as the fan module moves.

99. The autonomous vacuum cleaner defined in claim 97, wherein the cleaning head module includes one or more sensors providing data to the controller.

100. The autonomous vacuum cleaner defined in claim 99, wherein at least one of the one or more sensors is configured to track the power cord position.

101. The autonomous vacuum cleaner defined in claim 99, wherein the one or more sensors include one or more encoders, acoustic dirt sensors, ultrasonic distance sensors, moisture sensors, mold sensor or mechanical touch sensors.

102. The autonomous vacuum cleaner defined in claim 95, wherein the fan module provides power to the cleaning head module via a wire assembly extending axially along the hose.

103. The autonomous vacuum cleaner defined in claim 95, wherein the cleaning head module includes a cleaning brush assembly having at least one cleaning brush.

104. The autonomous vacuum cleaner defined in claim 103, wherein the cleaning head module further includes a motor to provide power to rotate the cleaning brush.

105. The autonomous vacuum cleaner defined in claim 103, wherein the cleaning brush is driven by air so as to cause rotational movement.

106. The autonomous vacuum cleaner defined in claim 103, wherein the cleaning brush is stationary.

107. The autonomous vacuum cleaner defined in claim 95, wherein the cleaning head module further includes a drive system having at least a propulsion mechanism.

108. The autonomous vacuum cleaner defined in claim 107, wherein the controller sends control signals to at least one motor in the cleaning head module.

109. The autonomous vacuum cleaner defined in claim 95, wherein the fan module includes a drive system having at least a propulsion mechanism and a steering mechanism to direct the motion of the fan module.

110. The autonomous vacuum cleaner defined in claim 109, wherein the controller sends control signals to at least one motor in the propulsion mechanism.

111. The autonomous vacuum cleaner defined in claim 95, wherein the cleaning head module is configured to move independently of the fan module in more than one direction.

112. An autonomous vacuum cleaner system comprising:
a cleaning head module;
a fan module separated from the cleaning module and having an electric motor to drive a fan;
a hose connecting the cleaning head module with the fan module and transferring dust from the cleaning head module to the fan module; and
a controller module including a controller and providing navigation control signals to the fan module, wherein the controller module is mobile.

113. An autonomous vacuum cleaner system comprising:
a cleaning head module;
a fan module separated from the cleaning module and having an electric motor to drive a fan;
a hose connecting the cleaning head module with the fan module and transferring dust from the cleaning head module to the fan module; and
a controller module including a controller and providing navigation control signals to the fan module, wherein the controller module is configured to perform localization and tracking functions for the fan module and the cleaning head module.

* * * * *

UNITED STATES PATENT AND TRADEMARK OFFICE
CERTIFICATE OF CORRECTION

PATENT NO. : 6,925,679 B2
DATED : August 9, 2005
INVENTOR(S) : Wallach et al.

It is certified that error appears in the above-identified patent and that said Letters Patent is hereby corrected as shown below:

Column 12,
Line 55, insert -- independently -- before "propelling".

Signed and Sealed this

Eighteenth Day of April, 2006

JON W. DUDAS
*Director of the United States Patent and Trademark Office*